July 17, 1962  A. BOUWERS  3,044,379
PANORAMIC CAMERA
Original Filed Nov. 13, 1956  2 Sheets-Sheet 1
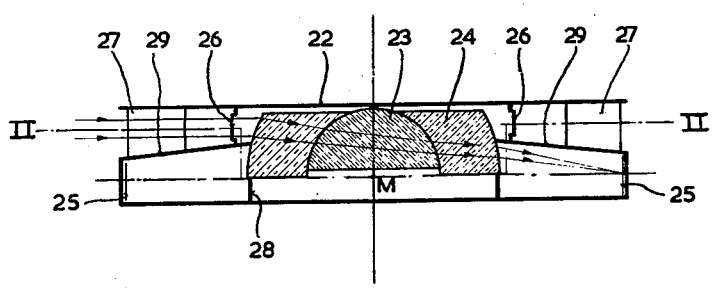
FIG. 1
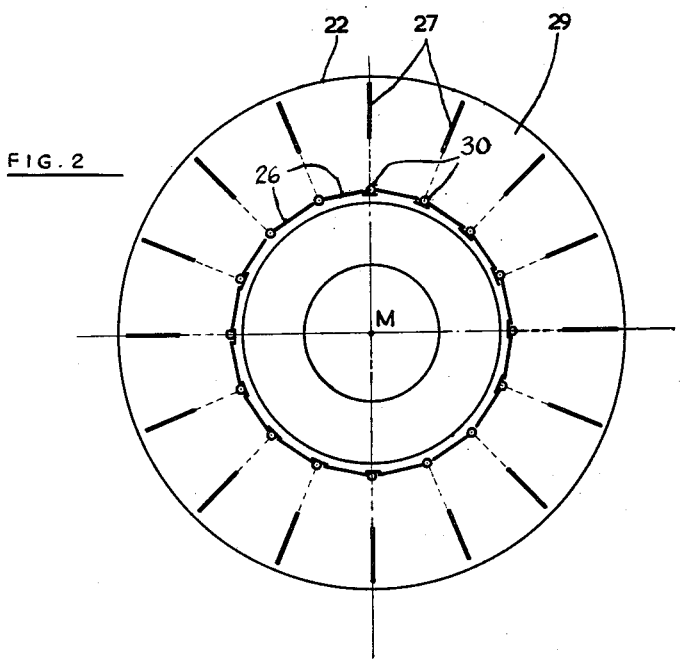
FIG. 2
FIG. 5
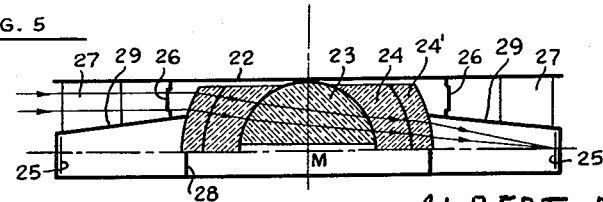
INVENTOR.
ALBERT BOUWERS
BY
Wendroth, Lind & Ponack
Attys.

July 17, 1962  A. BOUWERS  3,044,379
PANORAMIC CAMERA
Original Filed Nov. 13, 1956  2 Sheets-Sheet 2

INVENTOR.
ALBERT BOUWERS
BY
Wenderoth, Lind + Ponack
Attys

United States Patent Office 3,044,379
Patented July 17, 1962

3,044,379
PANORAMIC CAMERA
Albert Bouwers, The Hague, Netherlands, assignor to N.V. Optische Industrie de Oude Delft, Delft, Netherlands
Original application Nov. 13, 1956, Ser. No. 621,794, now Patent No. 2,923,220, dated Feb. 2, 1960. Divided and this application Dec. 7, 1959, Ser. No. 857,752
Claims priority, application Netherlands June 4, 1956
10 Claims. (Cl. 95—16)

This is a divisional application from my copending patent application Ser. No. 621,794, filed November 13, 1956, now Patent No. 2,923,220.

The invention relates to a panoramic camera, i.e. a camera whose field of view in one direction is considerably larger than the field of view in the direction perpendicular thereto.

For the photographing of pictures one dimension of which is much larger than the other (panoramas), various methods are conceivable and have in fact found practical application. In one of these methods use is made of a camera lens which, during the taking of the photograph, is moved by a driving mechanism along a stationary strip of film. Another method consists fundamentally in using a number of separate cameras mounted side by side, each of which covers its own particular portion of the total angular field desired. With these cameras, photographs are taken simultaneously which, when placed alongside each other, form the panoramic picture.

However, the two methods mentioned, in common with other known procedures, entail the drawback that the apparatus used is expensive and unwieldy.

The invention aims at providing a camera of the type indicated which covers in one direction a field up to 360° and which takes the photograph in one single exposure with a single, stationary optical system, using standard perforated or unperforated film.

According to the invention a panoramic camera has an optical system in the form of a portion of a transparent sphere which has one or more internal refracting surfaces concentric with the external surface of the sphere. The camera housing has a partition dividing the interior into an upper and a lower compartment. The partition fits around the optical system and defines thereon a light entrance area in the upper compartment and a light exit area in the lower compartment. Light rays within the angular field envisaged traverse the optical system in broadly radial directions and are focused on a film which is positioned on a transparent annular or partly annular film carrier in the lower compartment which surrounds the optical system. In order to limit the aperture of the optical system in the plane of the large field angle, a stop means is provided in front of the entrance area which is capable to prevent light rays having an angle of incidence exceeding a given value, from entering.

The optical system used in the camera has an image surface which, like all the concentric surfaces in the system, is spherically curved in such a way that the centre of the optical system is also the centre of the image surface.

As the vertical dimension of the panoramic image is considerably smaller than the horizontal dimension, in many cases a cylindrical surface will constitute a sufficient approximation to the exact shape of the image surface. The film carrier thus may assume the simple form of a cylindrically curved shell of transparent material against which the film can be placed. However, if very high standards are stipulated for the resolving power of the optical system, the above-mentioned approximation as to the shape of the film support is no longer possible and one has to use a spherically curved film carrier around which the film is stretched. This is not a serious drawback in practice, as the deviations from the cylindrical shape will in any case be very slight.

However, according to the invention an advantage may be gained by optically distorting the image surface to a purely cylindrical surface, which is achieved by interposing between the optical system and the film carrier coaxially with the film carrier, a cylindrically curved, transparent body whose surface facing the optical system and/or whose surface facing the film support is/are concavetoric in form. This body—which, for brevity's sake, will hereinafter be designated as "the image-flattening lens"— thus serves to lengthen the optical path of the light-rays which will form the edge portions of the image (considered with respect to the shortest dimension of the image) by such an amount with respect to the rays corresponding to the middle portion of the image that all points in the image will be situated at substantially equal distances from the axis of the film carrier.

According to the invention it is expedient for the image flattening lens to be so shaped that only its inner surface is toric in form, whilst the outer surface is given a cylindrical form enabling it to be used as film carriers. In this way the image flattening lens is situated at the shortest possible distance from the image surface, with the result that any aberrations introduced by this lens will have little effect on image quality. Moreover, for the same reason the toric inner surface of the lens need not be made with very great precision.

The flattening lens may, for instance, be ground and polished on a lathe.

In the invention the limitation of the aperture of the optical system to the desired value will preferably be effected by a form of stop device such that, except for slight variations, this aperture is the same for every point on the image surface. A very simple and neat solution of the aperture limiting problem is provided if the diaphragm is situated in front of the entrance surface of the optical system and comprises a plurality of thin, opaque, flat plates evenly distributed over the entrance surface, said plates being in planes substantially radial with respect to the axis of the film carrier. The aperture for the beams of light entering the optical system is limited in the direction of their widths by these plates, a portion of the lightrays in these beams, not entering the camera radially, being intercepted by the plates. Each stop plate thus gives a shadow for each direction of the incident light, the effect being such that shadows of adjacent plates overlap in the case of a direction deviating from the radial by more than a certain angle. With this type of diaphragm the effective aperture of the system is obviously determined by the length of the plates (i.e. their radial dimension) and by the spacing between them. This effective aperture can be made practically equal for all points on the image surface, so that a uniform illumination of the image surface is obtained.

A shutter of the camera may, according to the invention, be constructed for instance as a cylindrically curved vertical or horizontal slit shutter situated at the exit or entrance side for light rays of the optical system. In some case it will be found expedient to use, instead of this shutter, a light-tight ring or portion of a ring which is positioned coaxially with the film carrier in the path of the light-beams and which can be moved up and down by a driving mechanism.

In another advantageous embodiment of the camera according to the invention a shutter is provided comprising a plurality of blades spaced at regular distances from each other in front of the entrance surface of the optical system, all of these blades being rotatable on spindles substantially parallel to the film carrier axis and further comprising means whereby the shutter blades can be moved from the rest position in which they shut off the light from the entrance surface of the optical system, to the radial position required for exposure.

The driving means may comprise, for instance, a central cog wheel or cog rim of large diameter in mesh with small cog wheels fitted to the spindles of the shutter blades.

By rotating the central cog wheel through a small predetermined angle, all the shutter blades are made to rotate through an angle of 90°, thereby clearing the optical system for an exposure. The shutter blades can then be turned back or turned forward in the same direction, so that the shutter is again closed. With the latter method the moving back of the shutter blades through an angle of over 180° to the initial position is effected only at the next exposure. Owing to the fact that the shutter blades and the diaphragm plates described above may be similarly shaped, whilst the diaphragm plates of course only enter into play when the lens is open, it is in some cases possible according to the invention to combine the two functions into one set of blades or plates.

In the camera according to the invention it is generally desirable to make the top and bottom end faces of the optical system rough and to lacquer them with a dull finish in order to minimize reflection of light rays at these surfaces. The wish to have the largest possible field of view in the vertical direction, combined with the requirements to be observed in the manufacture of the camera lens, may result in an arrangement in which the effective light-rays brush very closely and at a very small angle along the end faces of the spherical segment. The reflection of these light-rays may thereby have an adverse effect upon the brilliancy of the image obtained.

According to the invention it may be found expedient under such circumstances to make the above-mentioned end faces concave and to cement on to them similarly shaped disks of transparent material whose index of refraction is equal to or differs but slightly from these of the materials of which the spherical segment is made. There will then be practically no reflection at these surfaces, a feature that is conducive to good quality of the image.

I am aware that concentric spherical systems of the kind referred to are known in themselves. As early as 1859, in the British Patent 2,193/1859, Sutton indicated an optical system consisting of concentric spherical shells, into which a liquid was introduced.

Of more recent data is the system, likewise concentric, reproduced in the Manual of Photogrammetry of the American Society of Photogrammetry, 2nd edition, Fig. 12B. The optical system of this wide-angle camera is in the shape of a sphere formed by concentric spherical shells and two hemispherical cores and gives a concentric, spherically curved image face. The emulsion support consists in this case of precisely ground bowl-shaped glass bodies on to which the sensitive emulsion is poured. The diaphragm is positioned in the centre of the system. The manufacture of the spherical emulsion supports is difficult, whilst the handling of these parts during photography is cumbrous and delicate. Another drawback is that no suitable shutter can be provided. For these reasons the system has not found acceptance. Besides, it will be understood that this already disclosed system is restricted for principle reasons to a field angle of less than 180°.

The characteristic feature of the invention may be better understood when reading the following description of some of its embodiments with reference to the drawings, in which:

FIG. 1 is a section of a so-called horizon camera with an image angle in the horizontal direction of 360°;

FIG. 2 is a section of the camera, cut in the plane II—II of FIG. 1;

FIG. 5 is a section of a camera similar to that shown in FIG. 1 with a modified lens.

Figure 3:
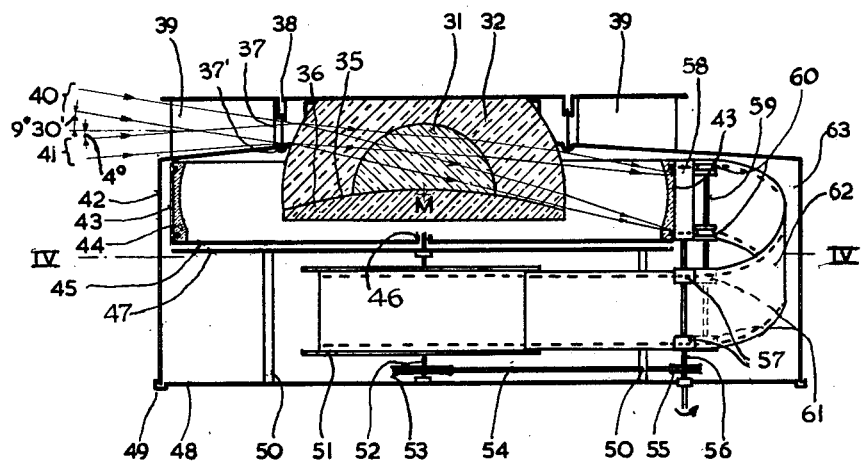
FIG. 3 is a section of a modified form of the horizon camera.

FIGURES 1 and 2 show schematically a camera according to the invention, which is adapted for an angular field in one direction of 360°, whilst the field in the direction perpendicular thereto is, for instance, 5°. With a camera of this kind the entire horizon can be covered in one single shot. The camera lens is shaped essentially as a spherical segment and consists of two cemented portions: the spherical segment 23 and the surrounding ring 24, which is part of a spherical shell. This optical system is mounted in a housing 22 shaped essentially as a flat, cylindrical box whose inner space is divided into two different levels by an annular partition 29 which, while fitting around the spherical segment, has a slight conical rise towards the centre. Under the ring 29 is the space through which the rays emerging from the camera lens move towards the film 25, which is placed around the circumference in the form of a cylindrical surface. The light-rays enter along the upper side of the ring 29, where the shutter 26 and the diaphragm 27 are situated, and are refracted downward by the optical system 23, 24 as shown in the drawing and made to converge at the required point on the image surface, which is situated in the lower level portion of the housing.

The corresponding light-rays from diametrically opposed points of the horizon run in the same meridional plane and therefore intersect at some point in the camera lens.

The outer surface of the spherical segment is divided by the ring 29 into two encircling zones situated one above the other, in the upper of which light enters, whilst in the lower zone the light from the diametrical opposite direction emerges from the system. By this arrangement it is possible to produce all horizontal angular fields between 180° and 360°, it being noted that for intermediate image angles the two zones need not extend around the entire spherical segment but may merely run parallel to each other through a certain angle.

The stop device in this case consists partly of radially positioned plates 27, the function of which is to limit the width of light beams entering the camera as has been fully explained in my copending application Serial No. 621,794, now Patent 2,923,220. In the embodiment shown in the drawing the same function is also performed by blades 26 of the shutter fitted behind the diaphragm. These blades 26 are rotatable on spindles 30 and can be actuated jointly by the release mechanism of the camera in a manner not shown in the drawing. For this purposes small cog wheels on spindles 30 could e.g. cooperate with a cog wheel of large cross-section which is driven by a spindle passing through point M. In the drawing it has been assumed that at each exposure the shutter blades 26 rotate through an angle of over 180°. The blades are shown in the closed position, the open position being indicated by dotted lines. In the latter position the shutter blades are lined up with the corresponding diaphragm plates and thus may perform the same function as the latter. It will be obvious that in certain cases the function of the fixed diaphragm plates can during exposure be taken over entirely by the shutter blades, so that separate stop plates are no longer required. For the prevention of scattered light, an opaque ring-shaped screen 28 is provided.

The data for the optical system of FIGURES 1 and 2 are as follows: The radius of curvature of the outermost surface of the spherical shell is 56.4 mm., that of the inner surface 28.3 mm. The spherical shell consists of optical glass with $n_D=1.648$ and a dispersion factor $\nu=34.1$, whilst portion 2 is of glass with $n_D=1.510$ and $\nu=63.8$. The focal length is 100 mm. and the relative aperture 1:5.6. The field is 5° x 360°.

Figure 4:
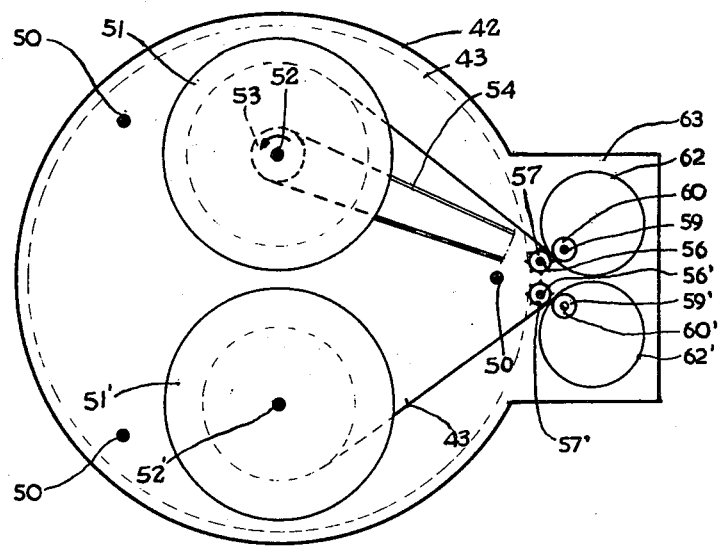
FIG. 4 is a section of the camera of FIG. 3, cut in the plane IV—IV.

FIGURES 3 and 4 show sections of another embodiment of the horizon camera according to the invention. The optiacl system again consists of a portion of a spherical shell 32 and a partial spherical core 31. The spherical segment thus formed has a concave lower face 35 on which the disk 36 is cemented, the function of which plate will be explained later. The focal length is 102 mm.; the spherical shell 32 has an inner radius of 28.18 mm. and an outer radius of 56.23 mm. The film is standard film of 36 mm. width and has a double perforation. The radius of the lower face 35, which is shown sperical in the drawing, is 200 mm. Disk 36 is made of the same material as the spherical shell 32, viz., glass having $n=1.648$ and $\nu=34.1$. The core 31 is again of glass having $n=1.510$ and $\nu=63.8$.

The shutter is formed by an opaque ring 37 which drops with its lower edge into groove 37' of the partition and can be moved upward via a dark slide 38 by means of appropriate appliances not shown in the drawing. The plates of the diaphragm are indicated as 39.

FIG. 3 shows the light beams 40 and 41 coming from the points in the object plane (considered at infinity) which are situated on the outermost boundaries of the vertical angular field. The total vertical field amounts to 13.5°, of which 9.5° is above the horizon and 4° below it. In cases where the aim is to obtain the largest possible field in a vertical direction, this field difference above and below the horizon is due to the presence of the cylindrical film chamber under the entrance zone of the camera lens. Whilst the field below the horizon is on this account bound down to practical limits, the field above the horizon need not for symmetry's sake be limited to the same angle. By displacing the film support 43 downward, the latter has been brought into such a position that its central point is situated under the horizontal plane passing through the centre M of the camera lens. This is tantamount to a field angle above the horizon laryer than that below the horizon. It is a fortunate circumstance that this angular field difference is in accordance with the demands that will be made upon the camera during normal use. The camera will practically always be mounted at a comparatively small height above the earth for taking photographs on which objects (buildings, trees, mountains) in an area extending a considerable distance from the camera are reproduced in full, whereas the flat foreground in the immediate environment of the camera which is of little value in a panorama does not appear on the photo.

By giving the film support a suitable construction in the shape of an image flattening lens 44, it has been ensured that the image surface will remain cylindrical even if the film 42 is positioned asymmetrically with respect to the camera lens.

As can be seen from FIG. 3 the comparatively large field of the camera in a vertical direction has the effect that the outermost beam 40 passes practically along the lower face of the spherical segment. It is not desirable to shift this lower face further downward, as in that case the spherical shell 32 could no longer be made in one piece. As already mentioned, an unduly high reflection from the lower face 35 of the spherical segment has, according to the invention, been prevented by the fact that this face has been ground to a concave form and is provided with the disk 36, cemented to it, which is made of a material having practically the same index of refraction. On its underside the disk is of course finished in such a way as to minimize any possible reflection of light diffused through the system. For the sake of completeness it may be noted that reflection-resisting disks like 36 can, if necessary, be placed against the two end faces as well or only against the upper face of the spherical segment.

FIGURES 3 and 4 reproduce schematically a special arrangement for the film conveyance system whereby the feed spool and the take-up spool of the camera are mounted underneath the optical system instead of beside it, thus permitting a very compact construction of the camera housing. In view of this the film is fed to the film carrier and removed after exposure in spiral loops.

Item 42 in the figures is the camera housing, on one of which there is an extension 63 containing the film loops. The bottom edge of the housing closes light-tight in a channel 49 of a bed plate 48. Joined to this bed plate by pins 50 is a chassis plate 47, which is kept at a distance by the metal pins. Supported by these two plates 47 and 48 is the film conveyance mechanism, consisting of the sprockets 57, 58, 57', 58' and the pressure rollers 60, 61, 60', 61' bearing upon them. For the sake of clarity in the drawing the details of the pivots have been omitted. Sprockets 57, 58 on the pulling side are rigidly mounted on the spindle 56, which is led out through the bed plate 48 and can be driven by suitable external agencies not shown in the drawing. The corresponding sprockets at the feed end 57', 58' are mounted on a spindle 56' which is not driven. Mounted on the spindle 59, which is pivotely mounted in spring-loaded levers not shown in the drawing, are pressure rollers 60, 61, which rotate freely and which serve to prevent the film from running off the sprockets. The pressure rollers 60', 61' (which are not visible in the figure) co-operate in a similar manner with the sprockets 57', 58'. Between the plates 47 and 48 are also the take-up' spool 51 and the film spool 51'. The spindle 52 of the first-mentioned spool is slip-driven via a rope drive 53, 54, 55 by the sprocket shaft 56, the film being thereby kept taut. The feed spool 51' rotates freely on the spindle 52'.

The film carrier 44 is mounted on a flat, circular table 45, which at 46 is pivotly mounted on to the chassis plate 47. The film 43 runs off the feed spool 51', passes between the sprockets 57 and the pressure rollers 61, after which it is formed into a loop 62' of 360° and thus becomes positioned at the same height as the film carrier of the camera. Passing between the sprockets 58' and the pressure rollers 60' (not visible in the figure), the film comes into the image surface, is stretched taut around the film carrier over an angle of nearly 360° and is finally guided in a similar manner, by means of sprockets 57, 58 and pressure rollers 60, 61, to the take-up spool 51.

It will be clearly seen, that the rotatable mounting of the film carrier 44 shown in the drawing, avoids all mutual motion between the film and film carrier which might cause damage to the film. After each exposure the table 45 together with the film carrier 44 makes a complete revolution during which the exposed portion of the film is wound off the carrier and a fresh piece of film taken up.

It goes without saying that the examples given do not exhaust the possibilities of the invention either as regards the lens or as regards further technical provisions of the camera. It should be noted in particular that, with a view to obtaining the desired state of correction, the optical system may be made up of a larger number of elements than are shown in the drawing; it may, for instance, comprise several spherical shells or shell portions made of different grades of glass. This modificaiton is illustrated in FIGURE 5, which shows a camera identical to that shown in FIGURE 1, except that the lens has a plurality of spherical shell portions 24 and 24' around the spherical segment 23.

What I claim is:

1. A panoramic camera having a horizontal field larger than 180°, comprising, a housing having an exposure aperture therein, an optical system in said housing substantially in the shape of a portion of a transparent sphere and having at least one internal refracting surface which is spherical and substantially concentric with the external surface of said optical system, a horizontal partition in said housing which divides the interior thereof into an upper compartment and a lower compartment and fits around said optical system, to thereby define a first area of said external surface which is above said partition and serves as an entrance surface of said optical system for light rays incident through said exposure aperture and a second area of said external surface which is below said partition and serves as an exit surface of said optical system for light rays having traversed said optical system, a transparent film carrier in said lower compartment spaced from said exit surface for carrying a strip of film on its outer surface, said outer surface being substantially cylindrical and having a vertical axis passing through the common center of curvature of said external and internal surfaces, and stop means in the path of the light rays before said entrance surface for preventing such incident light rays from entering said optical system whose angle with a vertical plane radial to said optical system exceeds a given value.

2. A panoramic camera as claimed in claim 1, wherein said optical system comprises a transparent central body in the shape of a spherical segment having a substantially plane bottom end face, and a portion of a transparent concentric spherical shell surrounding said central body, said spherical shell having on its outer surface said entrance and exit surfaces of said optical system.

3. A panoramic camera as claimed in claim 1, wherein said optical system comprises a transparent central body in the shape of a spherical segment having a substantially plane bottom end face, and a number of portions of spherical shells, the innermost of said spherical shells surrounding said central body, and the outermost of said spherical shells having on its outer surface said entrance and exit surfaces of said optical system.

4. A panoramic camera as claimed in claim 1, wherein there is interposed in the path of the light rays between said exit surface of said optical system and the outer surface of said film carrier an annular lens having at least one concave-toric refractive surface, whereby the focal surface of said optical system is made cylindrical.

5. A panoramic camera as claimed in claim 1, wherein said film carrier comprises a cylindrical outer surface and a refractive concave-toric inner surface.

6. A panoramic camera as claimed in claim 1, wherein said stop means comprises a plurality of thin, opaque, flat plates evenly distributed over said exposure aperture, said plates being in vertical planes radial to said vertical axis of said film carrier.

7. A panoramic camera as claimed in claim 6, wherein said stop plates are simultaneously rotatable about vertical axes so as to function as shutter blades.

8. A panoramic camera as claimed in claim 1, having a shutter in the form of a ring mounted in the path of the light rays coaxially with said film support and reciprocable vertically.

9. A panoramic camera as claimed in claim 1, having a shutter comprising a plurality of thin, opaque blades spaced at regular distances from each other in front of said entrance surface of said optical system, said blades being rotatably mounted on vertical spindles, and means for moving said blades from a rest position at which they shut off light from the entrance surface of said optical system to the radial position required for exposure.

10. A panoramic camera as claimed in claim 1, wherein said film carrier is mounted in said housing for free rotation about its vertical axis whereby during transport of said strip of film said film carrier is made to rotate at the same circumferential speed as said strip of film.

References Cited in the file of this patent

UNITED STATES PATENTS 687,592    Bannell _____ Nov. 26, 1901

FOREIGN PATENTS 2,193    Great Britain _____ Sept. 28, 1859